United States Patent
Thomaides et al.

(10) Patent No.: US 10,472,442 B2
(45) Date of Patent: Nov. 12, 2019

(54) COPOLYMERS AND USES THEREOF

(71) Applicant: Akzo Nobel Chemicals International, B.V., Arnhem (NL)

(72) Inventors: John Socrates Thomaides, Berkeley Heights, NJ (US); John M. Morales, Warren, NJ (US); Qiwei He, Belle Mead, NJ (US); Damien Christian Vadillo, Franklin, NJ (US); Michael Timothy Philbin, Hopewell, NJ (US)

(73) Assignee: NOURYON CHEMICALS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 16/070,867

(22) PCT Filed: Feb. 3, 2017

(86) PCT No.: PCT/EP2017/052314
§ 371 (c)(1),
(2) Date: Jul. 18, 2018

(87) PCT Pub. No.: WO2017/134189
PCT Pub. Date: Aug. 10, 2017

(65) Prior Publication Data
US 2019/0023826 A1 Jan. 24, 2019

Related U.S. Application Data

(60) Provisional application No. 62/291,583, filed on Feb. 5, 2016.

(30) Foreign Application Priority Data

Mar. 3, 2016 (EP) ..................................... 16158358

(51) Int. Cl.
*C08F 212/08* (2006.01)
*C08F 220/18* (2006.01)
*C10L 1/196* (2006.01)
*C10L 1/18* (2006.01)

(52) U.S. Cl.
CPC .......... *C08F 220/18* (2013.01); *C08F 212/08* (2013.01); *C10L 1/18* (2013.01); *C10L 1/1963* (2013.01); *C08F 2220/1875* (2013.01); *C08F 2500/01* (2013.01); *C10L 2200/0446* (2013.01); *C10L 2230/22* (2013.01); *C10L 2270/026* (2013.01)

(58) Field of Classification Search
CPC .............................. C08F 212/08; C08F 220/18
See application file for complete search history.

(56) References Cited

U.S. PATENT DOCUMENTS

| 3,485,775 A | 12/1969 | Cenci et al. |
| 3,553,294 A | 1/1971 | McGary, Jr. et al. |
| 4,131,572 A | 12/1978 | Brendley, Jr. |
| 4,188,219 A | 2/1980 | Cawley |
| 4,388,434 A | 6/1983 | Swift et al. |
| 4,983,186 A | 1/1991 | Naiman et al. |
| 5,906,665 A | 5/1999 | Trippe et al. |
| 6,586,097 B1 | 7/2003 | Pascault et al. |
| 6,624,273 B1 | 9/2003 | Everaerts et al. |
| 8,043,388 B2 | 10/2011 | Waters et al. |
| 2011/0192076 A1 | 8/2011 | Hess et al. |
| 2012/0276380 A1 | 11/2012 | Traser et al. |
| 2015/0197591 A1 | 7/2015 | Pierre et al. |
| 2016/0272746 A1 | 9/2016 | Utsunomiya |
| 2016/0280814 A1 | 9/2016 | Nakao |
| 2018/0127669 A1 | 5/2018 | Thomaides et al. |
| 2018/0148529 A1 | 5/2018 | Thomaides et al. |

FOREIGN PATENT DOCUMENTS

| CA | 2 889 070 C | 11/2017 |
| CN | 103992428 A | 8/2014 |
| DE | 1122197 | 1/1962 |
| EP | 0 626 442 A1 | 11/1994 |
| EP | 1 260 278 A2 | 11/2002 |
| GB | 573364 | 11/1945 |
| GB | 1 259 113 | 1/1972 |
| GB | 1 332 593 | 10/1973 |
| GB | 1 569 344 | 6/1980 |
| JP | 2015/110768 A | 6/2015 |
| WO | 2006/116692 A1 | 11/2006 |
| WO | 2014/110203 A1 | 7/2014 |
| WO | 2014/148148 A1 | 9/2014 |
| WO | 2015/071600 A1 | 5/2015 |
| WO | 2015/091513 A1 | 6/2015 |

(Continued)

OTHER PUBLICATIONS

Koike et al., Polym. Int. 2015, 64, 188-195.*
Zhang et al., Journal of Applied Polymer Science, 2013, 113-120.*
Burgt et al. "The Shell Middle Distillate Synthesis Process," 5$^{th}$ Synfuels Worldwide Symposium, Washington DC, (1985).
Huaxue Yu Nianhe (2006), 28(3), 194-197, Coden: Hyzhen; ISSN: 1001-0017, Abstract.
Notification of Transmittal of the International Search Report and the Written Opinion of the International Searching Authority, or the Declaration from the International Bureau of WIPO for International Application No. PCT/EP2017/052314 dated Mar. 1, 2017.
European Search Report issued in the counterpart European Application No. 16158358.8 dated Jun. 29, 2016.

(Continued)

*Primary Examiner* — Vu A Nguyen
(74) *Attorney, Agent, or Firm* — Lorenz & Kopf, LLP

(57) ABSTRACT

The invention relates to a specific copolymer obtainable by co-polymerizing at least the following monomers: —more than 80 wt % of at least one bicyclic (meth)acrylate ester, —0.05 to 15% w/w styrene, and —optionally other ethylenically unsaturated monomers, as well as to the way to synthesize them and the use of such polymers to modify the rheology of a liquid in which they are soluble.

15 Claims, No Drawings

(56) References Cited

FOREIGN PATENT DOCUMENTS

WO    2016/188837 A1    12/2016
WO    2016188850 A1    12/2016

OTHER PUBLICATIONS

Imoto, S. et al. "The Synthesis of Bornylmethacrylate and Isobornylmethacrylate along with the Radical Copolymerization of Stryene, and Vinyl Chloriride", The Journal of Industrial Chemicals, 1963, pp. 988-991, vol. 66, No. 7.

Imoto, M. et al. "Vinyl Polymerization LXXIII. Polymerization and Copolymerization of Bornyl or Isobornyl Methacrylate," Journal of Polymer Science: Part A, 1964, pp. 1407-1419, vol. 2.

Koike, K., et al. "A highly transparent and thermally stable copolymer of 1-adamantyl methacrylate and styrene", Polymer Int., 2015, pp. 188-195, vol. 64.

* cited by examiner

COPOLYMERS AND USES THEREOF

This application is a national stage filing under 35 U.S.C. § 371 of PCT/EP2017/052314, filed Feb. 3, 2017, which claims priority to U.S. Provisional Patent Application No. 62/291,583, filed Feb. 5, 2016, and European Patent Application No. 16158358.8, filed Mar. 3, 2016, the contents of which are each incorporated herein by reference in their entireties.

FIELD OF INVENTION

The present invention relates to a copolymer, its synthesis, and uses of the copolymer.

BACKGROUND

Polymers have previously been used for modifying the rheology of a fluid by incorporation of the polymer in the fluid. There is a need for polymers that can be used to adjust the flow and spray characteristics of a petroleum based fuel, such as gasoline and diesel fuel.

Liquid hydrocarbon fuels as such are typically not combustible. They must first be vaporized and mixed with air, or oxygen, to burn. As middle distillate or heavier petroleum fuel fractions have low vapor pressures, efficient atomization is a critical aspect of combustion of such fuels.

Atomization produces fine liquid fuel particles, whose large surface area leads to fast evaporation and thus rapid and efficient combustion. Even with efficient atomization stoichiometric combustion cannot be achieved. Limitation is imposed in this respect by the inability to reach a condition of perfect mixing in the time and size scale of the combustion process and equipment. In order to get complete combustion, therefore, it is necessary to supply excess air to the system.

Excess air, to the extent it provides complete combustion, serves to increase combustion efficiency. However, too much air can lead to a decrease in heat recovery. All of the oxygen not involved in the combustion process as well as all of the nitrogen in the air is heated and thus carries heat out of the stack. Further, the greater the excess air the greater the mass flow through the system and the shorter the time scale for heat transfer. Hence, achieving efficient combustion and heat recovery requires a delicate balance of atomization and excess air coupled with optimized combustion chamber and heat recovery system designs.

GB 1 569 344 relates to the use of polymers, especially poly-isobutylene, to modify the fuel properties in an attempt to improve the combustion efficiency. A problem with poly-isobutylene was found that it is very difficult to handle, which is exemplified by its Tg of −75° C. Other known polymers like poly-lauryl methacrylate also suffer from such a low Tg. Other polymers, such as poly isobornyl (meth) acrylates, were found to not give the desired rheological properties at acceptable costs and suffer from poor solubility. EP 1 260 278 discloses a coating composition containing a resin constituting for 80 wt % of isobornyl (meth)acrylates and 20 wt % or less of other monomers. The disclosed polymers, like most polymers with a higher Tg, were found to suffer from insufficient solubility of the polymer, making them unsuitable for changing the rheology of the liquid. Therefore, there still exists a need for alternative polymers with the ability of modifying the rheology of liquids, such as petroleum based fuel, at a reasonable cost and having acceptable solubility, particularly in fuels.

SUMMARY OF INVENTION

One object of the invention is to provide a polymer with the ability to modify the rheology of petroleum based fuel, in a manner that can positively influence the combustion efficiency in an internal combustion engine run using such fuel. In another object a polymer is provided that has a better performance in combustion efficiency than poly isobornyl (meth)acrylates. In another object a polymer is provided that has handling and performance properties at least equal to poly isobornyl (meth)acrylates but with a lower price.

The present inventors have found that this object can at least partly be met by a polymer according to the present invention, which will now be more described in detail.

In the search for polymers with better handling properties but which are active in improving fuel efficiency when used in fuels, Applicant unexpectedly found that such polymers results if they comprise specific amounts of one or more bicyclic (meth)acrylate esters and specific amounts of styrene. The polymers were found to also have a better price/performance than the conventional poly isobornyl (meth) acrylates.

Accordingly, the present invention relates to a copolymer obtainable by copolymerizing the following monomers:
more than 80 wt % of one or more bicyclic (meth)acrylate esters,
less than 20 wt % of a combination of styrene, and optional further ethylenically unsaturated monomers.

DETAILED DESCRIPTION OF THE INVENTION

For the polymers of the invention to be suitable for modifying the rheology of a fluid containing the polymer, the polymer must be sufficiently soluble in said fluid. The fluid can be any fluid. In an embodiment it is not a fuel. Throughout this document sufficient solubility in any fluid is determined by analyzing the cloud point. The cloud point is determined using a 2% by weight solution of the polymer in a 80:20 petrodiesel:gas to liquid diesel fuel (v/v). Sufficient solubility is defined to be a cloud point of below 10° C. Preferably the cloud point is below 0° C. such that the polymers do not precipitate from the solution at temperatures around 0° C. Details on the cloud point determination that is used for this analysis is found in the experimental section below.

The bicyclic (meth)acrylate ester contains a (meth)acryloyl radical bonded to a six-membered carbon atom bridged ring and said group of monomers include products like decahydronaphthyl (meth)acrylates, and adamantyl (meth) acrylates, but preferred are products according to formula (I)

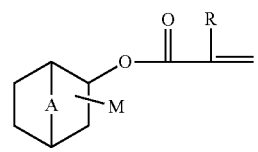

wherein
R is H or —CH$_3$,
A is —CH$_2$—, —CH(CH$_3$)— or —C(CH$_3$)$_2$—, and
one or more M is covalently bonded to any carbon of the bicyclic rings, preferably to a carbon atom of the six-membered ring, and is selected from the group consisting of hydrogen, halogen, methyl and methylamino group or a plurality thereof. Non-limiting examples of the bicyclic (meth)acrylate esters include isobornyl (meth)acrylate, bornyl (meth)acrylate, fenchyl (meth)acrylate, isofenchyl (meth)acrylate, norbornyl (meth)acrylate, cis, (endo) 3-methylamino-2-bornyl (meth)acrylate, 1,4,5,6,7,7-hexachlorobicyclo [2.2.1]-hept-5-ene-2-ol (meth)acrylate (HCBOMA) and 1,4,5,6,7,7-hexachlorobicyclo [2.2.1]-hept-5-ene-2 methanol (meth)acrylate (HCBMA), and mixtures of such bicyclic (meth)acrylates. The chlorinated compounds are less preferred since they can liberate corrosive HCl when burned. A suitable bicyclic (meth)acrylate ester is isobornyl methacrylate. The bicyclic (meth)acrylate esters are known per se and may be prepared in known fashion or may be obtained from commercial sources. The bicyclic (meth)acrylate is preferably chosen from monomers which, when polymerized, form a homopolymer that is soluble in the liquid, preferably in fuel, more preferably in the 80:20 petrodiesel:gas to liquid diesel fuel.

The ethylenically unsaturated monomers which are optionally present include:

1. fatty-alkyl (meth)acrylates, which are compounds wherein a (meth)acryloyl radical is bonded to a fatty alkyl group, herein defined as a C8-C24 alkyl group, preferably a C10-C22 group, which can be linear or branched, substituted or unsubstituted, saturated or unsaturated. Examples of the fatty alkyl (meth)acrylate include 2-ethylhexyl (meth)acrylate, decyl (meth)acrylate, isodecyl (meth)acrylate, lauryl (meth)acrylate, methacrylic ester 13.0 (CAS#: 90551-76-1), tetradecyl (meth)acrylate, hexadecyl (meth)acrylate, methacrylic ester 17.4 (CAS#: 90551-84-1), and stearyl (meth) acrylate. Preferred fatty-alkyl (meth)acrylates are chosen from monomers which, when polymerized, form a homopolymer which is soluble in diesel fuel. In another embodiment isodecyl (meth)acrylate, lauryl (meth)acrylate, methacrylic ester 13.0 (CAS#: 90551-76-1), methacrylic ester 17.4 (CAS#: 90551-84-1), and/or stearyl (meth)acrylate is used. In yet another embodiment, lauryl (meth)acrylate and/or methacrylic ester 13.0 (CAS#: 90551-76-1) is used. Suitably lauryl methacrylate is used;

2. Aromatic vinyl monomers other than styrene, that contain a vinyl group bonded to an aromatic group. Examples include substituted styrenes, vinyl naphthalene, divinylbenzene, and mixtures thereof. Preferred substituted styrenes include ortho-, meta- and/or para-alkyl, alkyloxy or halogen substituted styrenes, such as methyl styrene, 4-tert-butyl styrene, tert-butyloxy styrene, 2-chlorostyrene and 4-chlorostyrene. The aromatic vinyl monomer is preferably chosen from monomers which, when polymerized, form a homopolymer that is not soluble in the liquid, preferably in fuel, more preferably in the 80:20 petrodiesel:gas to liquid diesel fuel;

3. Ethylenically unsaturated monomers different from the monomers in groups 1 and 2 defined above. Examples of such other monomers include lower alkyl (meth)acrylates, wherein lower alkyl denotes an alkyl group with less than 8 carbon atoms, such as methyl (meth)acrylate, ethyl (meth) acrylate, propyl (meth)acrylate, butyl (meth)acrylate, isobutyl (meth)acrylate, pentyl (meth)(acrylate) and hexyl (meth) acrylate, but also cationic, nonionic and anionic ethylenically unsaturated monomers, including, but not limited to, ethylenically unsaturated acids, such as (meth)acrylic acid, maleic acid, 2-acrylamido-2-methylpropane sulfonic acid, dimethylaminoethyl methacrylate, dimethylaminoethyl acrylate, N-[3-(dimethylamino) propyl] methacrylamide, N-[3-(dimethylamino) propyl] acrylamide, (3-acrylamidopropyl)-trimethyl-ammonium chloride, methacrylamido propyl trimethyl ammonium chloride, (meth)acrylamide, N-alkyl (meth)acrylamides, N-vinyl pyrrolidone, vinyl formamide, vinyl acetamide, and N-vinyl caprolactams.

In an embodiment of the invention, for any of the ethylenically unsaturated monomer that is optionally present, said monomer does not comprise chlorine or other elements, such as sulfur, which upon combustion result in corrosive products in exhaust systems, such as HCl and $H_2SO_4$ respectively.

In an embodiment the ethylenically unsaturated monomer that is used does not comprise elements that increase the emission of NOx compounds when said ethylenically unsaturated monomer is present in the fuel.

In yet another embodiment all the ethylenically unsaturated monomers are selected such that the resulting polymer, when used in a fuel and when said fuel is combusted, leads to a reduction in the emission of NOx compounds per kW produced by the engine burning said fuel.

In yet another embodiment all the ethylenically unsaturated monomers are selected such that the resulting polymer, when used in a fuel and when said fuel is combusted, leads to a reduction in the emission of particulate matter per kW produced by the engine burning said fuel (compared to burning the same fuel without the polymer).

The copolymer may be synthesized by conventional methods for vinyl addition polymerization known to those skilled in the art, such as, but not limited to, solution polymerization, precipitation polymerization, and dispersion polymerizations, including suspension polymerization and emulsion polymerization.

In an embodiment the polymer is formed by suspension polymerization, wherein monomers that are insoluble in water or poorly soluble in water are suspended as droplets in water. The monomer droplet suspension is maintained by mechanical agitation and the addition of stabilizers. Surface active polymers such as cellulose ethers, poly(vinyl alcohol-co-vinyl acetate), poly(vinyl pyrrolidone) and alkali metal salts of (meth)acrylic acid containing polymers and colloidal (water insoluble) inorganic powders such as tricalcium phosphate, hydroxyapatite, barium sulfate, kaolin, and magnesium silicates can be used as stabilizers. In addition, small amounts of surfactants such as sodium dodecylbenzene sulfonate can be used together with the stabilizer(s). Polymerization is initiated using an oil soluble initiator. Suitable initiators include peroxides such as benzoyl peroxide, peroxy esters such as tert-butylperoxy-2-ethylhexanoate, and azo compounds such as 2,2'-azobis(2-methylbutyronitrile. At the completion of the polymerization, solid polymer product can be separated from the reaction medium by filtration and washed with water, acid, base, or solvent to remove unreacted monomer or free stabilizer.

In another embodiment the polymer is formed by an emulsion polymerization, wherein one or more monomers are dispersed in an aqueous phase and polymerization is initiated using a water soluble initiator. The monomers are typically water insoluble or very poorly soluble in water, and a surfactant or soap is used to stabilize the monomer droplets in the aqueous phase. Polymerization occurs in the swollen micelles and latex particles. Other ingredients that might be present in an emulsion polymerization include chain transfer agents such as mercaptans (e.g. dodecyl mercaptan) to control molecular weight, small amounts of water soluble organic solvents such as but not limited to acetone, 2-butanone, methanol, ethanol, and isopropanol, to adjust the polarity of the aqueous phase, and electrolytes to control the pH. Suitable initiators include alkali metal or ammonium salts of persulfate such as ammonium persulfate, water-soluble azo compounds such as 2,2'-azobis(2-aminopropane)dihydrochloride, and redox systems such as Fe(II) and cumene hydroperoxide, and tert-butyl hydroperoxide-Fe(II)-sodium ascorbate. Suitable surfactants include anionic surfactants such as fatty acid soaps (e.g. sodium or potassium stearate), sulfates and sulfonates (e.g. sodium dodecyl benzene sulfonate), sulfosuccinates (e.g. dioctyl sodium sulfosuccinate); non-ionic surfactants such as octylphenol ethoxylates and linear and branched alcohol ethoxylates; cationic surfactants such as cetyl trimethyl ammonium chloride; and amphoteric surfactants. Anionic surfactants and combinations of anionic surfactants and non-ionic surfactants are most commonly used. Polymeric stabilizers such as poly(vinyl alcohol-co-vinyl acetate) can also be used as surfactants. The solid polymer product free of the aqueous medium can be obtained by a number of processes including destabilization/coagulation of the final emulsion followed by filtration, solvent precipitation of the polymer from latex, or spray drying of the latex.

One skilled in the art will recognize that certain surfactants and initiator systems could leave residues in the polymer that will be undesirable in the fuel. Again, these may include sulphur containing species and halides, but also mono- and multivalent metals or their ions. One can either select alternative surfactants and initiators that will not leave such residues, or choose an isolation/purification process that will remove or minimize any unwanted residues.

In an embodiment, the present invention relates to a copolymer obtainable by copolymerizing the following monomers:
more than 80 wt % of one or more bicyclic (meth)acrylate esters,
less than 20 wt % of styrene, and optional further ethylenically unsaturated monomers.

In an embodiment, the copolymer is polymerized from:
more than 80 and up to 99.95 wt % of the bicyclic (meth)acrylate ester (a), 0.05 to 15 wt % of styrene (b), and optional ethylenically unsaturated monomers (c) that are not monomer (a) or (b).

Throughout this document, the weight percentages (wt %) of the monomer that constitute the copolymer, are based on the total weight of the monomers used, whereby the total weight of the monomers adds up to 100 wt %.

In an embodiment, the copolymer is polymerized from:
81 to 99.95 wt %, preferably 82-99.95 wt %, more preferably 83-99.95 wt %, even more preferably 85-99.95 wt %, most preferably 90-99.95 wt %, of the bicyclic (meth) acrylate ester (a),
0.05 to 12 wt %, preferably 1-10 wt %, more preferably 2.5-8.0 wt % of styrene (b), and
0 to 19 wt %, preferably 0-18 wt %, more preferably 0-15 wt %, of ethylenically unsaturated monomers not being a monomer (a) or (b).

For each of the embodiments it is preferred that the sum of monomer (a) and monomer (b) is greater than or equal to 83 wt %, more preferably greater than or equal to 90 wt %; and most preferably greater than or equal to 95 wt %, most preferably greater than or equal to 99 wt % of the total monomer composition.

Preferably, in each embodiment, the amount of the other ethylenically unsaturated monomers not being a) or b) does not exceed 10 wt %, more preferably does not exceed 5 wt %, even more preferably does not exceed 1 wt %, and in certain embodiments, monomers a), and styrene together constitute 100 wt % of the monomers used to form the copolymer.

In a proviso, the copolymers are not composed of at least one bicyclic (meth)acrylate ester, at least one fatty-alkyl (meth)acrylate, and at least one lower-alkyl (meth)acrylate. Also they may not be copolymers of at least one bicyclic (meth)acrylate ester, at least one fatty-alkyl (meth)acrylate, at least one lower-alkyl (meth)acrylate, and at least one aromatic vinyl monomer, particularly not copolymers wherein the weight percentage of bicyclic (meth)acrylate is more than 15 weight percentage higher than the amount of aromatic vinyl monomer. In an embodiment of this proviso the copolymers contain more than 20, preferably more than 10, more preferably more than 5 wt % of the fatty-alkyl (meth)acrylate. In another embodiment of this proviso the copolymers contain more than 20, preferably more than 10, more preferably more than 5 wt % of the lower-alkyl (meth)acrylate.

In another proviso the copolymers are not composed of at least one bicyclic (meth)acrylate ester, at least one fatty-alkyl (meth)acrylate, optionally at least one aromatic vinyl monomer, and optionally other ethylenically unsaturated monomers. In an embodiment of this proviso the copolymers are not composed of 20 to 95 wt % of the bicyclic (meth)acrylate ester, 5 to 80 wt %, preferably 5-40 wt %, of the fatty-alkyl (meth)acrylate, up to 65 wt % of aromatic vinyl monomer, and optionally other ethylenically unsaturated monomers. In an embodiment of this proviso the copolymers contain more than 20, preferably more than 10, more preferably more than 5 wt % of the fatty-alkyl (meth) acrylate. In another embodiment of this proviso the copolymers contain more than 20, preferably more than 10, more preferably more than 5 wt % of aromatic vinyl monomer. In another embodiment of this proviso the copolymers contain more than 20, preferably more than 10, more preferably more than 5 wt % of other ethylenically unsaturated monomers.

It was surprisingly found that although a homopolymer of styrene has a very high cloud point in 80:20 petrodiesel:gas to liquid diesel fuel (>150° C.), that a small amount of this monomer can be copolymerized with isobornyl methacrylate to give a highly soluble copolymer with a desirable cloud point below 12.5° C. What is more, in a very specific concentration range for the styrene, the cloud point of the copolymer was found to be even lower than the cloud point of poly(isobornyl methacrylate) which has a cloud point of 0.5-3° C. In a preferred embodiment the copolymer has a cloud point which is lower than 0° C.

If so desired, particularly to control the molecular weight and the molecular weight distribution of the polymer and/or to control rheological behavior of solutions of the polymer, small amounts of divinylbenzene can be used in the mix of monomers. Typically divinylbenzene levels are below 5%, preferably below 2%, more preferably below 1%.

In the copolymer of the invention, the monomers may be arranged in any fashion, such as in blocks or randomly. Preferably, the copolymer is a randomly arranged copolymer.

The weight averaged molecular weight (Mw) of the copolymer of the invention, when measured in accordance with the method presented in the experimental section, is preferably at least 200.000 D, 250,000 D, or at least 400,000 D. For such polymers the influence on the rheology of the fluid in which they are dissolved is very cost efficient. The upper molecular weight is determined by the solubility in the fluid in which it is intended to be used. Suitable the Mw is 50,000,000 or less, preferably less than 25,000,000. Polymers with a composition of the invention and a molecular weight of 100,000 to 50,000,000, preferably 250,000 to 5,000,000 D were found to be useful at low concentrations, which made them particularly suitable for the application in fuel, particularly for use in additive packages for fuel. The polydispersity index (PDI), i.e. Mw/Mn, of the copolymer of the invention is suitably from 1 to 10, preferably from 1 to 5. Therefore, in an embodiment, the Mn of the polymers of the invention is 20.000 D or more.

The glass transition temperature of the copolymer of the invention is preferably from 50 to 220° C., more preferably from 65 to 210° C., and in another embodiment from 95 to 200° C., as determined by Differential Scanning calorimetry (DSC). In this document the glass transition temperatures (Tg) were measured using a DSC Q200 (TA Instruments, New Castle, Del.) with the following program:
1) Start DSC run with isothermal of 15 min at 20 degree C.;
2) Ramp the temperature at 10 degree C./min to roughly 20 degree C. above the Tg of the material;
3) Run isothermal at that temperature for 5 min;
4) Ramp temperature down from 20 degree C. above Tg at 20 degree C./min to 20 degree C.;
5) Run isothermal at 20 degree C. for 5 min;
6) Start the Modulate mode with the process condition of +/−1.280 degree C. for every 60 second;
7) Ramp the temperature at 2 degree C./min to 180 degree C.;

The composition of the polymer can be reliably estimated from the relative amounts of the monomers fed into the polymerization. Alternatively, the composition of the copolymer is suitably determined from carbon-13 NMR spectra using a Varian MR-400 MHz and/or an Agilent DD2 MR 500 MHz NMR spectrometer.

The polymer of the invention is advantageously added to a petroleum based fuel suitable for running combustion engines, such as fuels conventionally known as gasoline and diesel fuels. The polymer is preferably added to the fuel in an amount effective to obtain a combustion efficiency improving effect. Typically, the polymer of the invention is added to the fuel to concentrations below 10,000 ppm (parts per million), such as from 5, from 10, from 50, from 100 or from 500 ppm, preferably up to 3000 or 5,000 ppm. The term "ppm" equates to one mg per kg. In an embodiment, the copolymer is preferably present in a fuel composition in an amount in the range of from 10 ppm to 300 ppm, more preferably in the range of from 10 to 100, for example 25 ppm to 80 ppm, based on the total weight of the fuel composition.

The advantages of the copolymers of this invention are that (1) they are better suited to adjust the flow and spray characteristics of a petroleum based fuel than conventional polymers; (2) the cloud point of the copolymers is low enough to allow handling of the polymer at temperatures of 0° C., (3) the cost of these copolymers will be lower than that of poly(isobornyl methacrylate) and other conventional polymers, and (4) they can be used in additive packages for use in fuel.

As used herein, "gasoline" refers to a liquid hydrocarbon based fuel suitable for running a spark ignition engine, as is commonly known in the art, and includes such fuels from petroleum raw material, renewable raw material, and mixtures thereof.

As used herein "diesel" refers to a liquid hydrocarbon based fuel suitable for running a compression ignition engine, as is commonly known in the art, and includes such fuels from petroleum raw material, renewable raw material, and mixtures thereof.

The term "consisting" wherever used herein also embraces "consisting substantially", but may optionally be limited to its strict meaning of "consisting entirely".

Throughout the description and claims of this specification, the words "comprise" and "contain" and variations of the words, for example "comprising" and "comprises", mean "including but not limited to", and do not exclude other moieties, additives, components, integers or steps. Moreover the singular encompasses the plural unless the context otherwise requires: in particular, where the indefinite article is used, the specification is to be understood as contemplating plurality as well as singularity, unless the context requires otherwise.

Where upper and lower limits are quoted for a property, for example for the concentration of a fuel component, then a range of values defined by a combination of any of the upper limits with any of the lower limits may also be implied.

It should be appreciated that the various aspects and embodiments of the detailed description as disclosed herein are illustrative of the specific ways to make and use the invention and do not limit the scope of invention when taken into consideration with the claims and the detailed description. It will also be appreciated that features from different aspects and embodiments of the invention may be combined with features from any other aspects and embodiments of the invention.

In the context of the invention the term '(meth)acrylate' indicates acrylate or methacrylate, and '(co)polymer' indicates polymer or copolymer. The term 'polymer' and the term 'copolymer' are used herein interchangeably.

In additions to the hydrocarbons and the polymer, gasoline and diesel fuels may contain other additives as commonly used in the art. For determining solubility in diesel, a 80:20 petrodiesel (B0):gas to liquid (GTL) diesel fuel (v/v), in accordance with the EN 590 diesel fuel specification is used. This fuel is considered to be the most demanding fuel with respect to solubility of a polymer. Therefore a polymer which passes the solubility criterion in this fuel is considered to be useful for dissolution into any fuel.

It is noted that a B0 fuel in accordance with EN 590, for the purpose of this invention SS-EN 590:2009, has a cetane number >=51.0 and a Cetane index of >=46.0, and comprises no biofuel, so the amount of fatty acid methyl ester is essentially 0%. Shell™ "Gas-to-liquids" or "GTL" technology (formerly known as the SMDS (Shell Middle Distillate Synthesis)) is described in "The Shell Middle Distillate Synthesis Process", van der Burgt et al, paper delivered at the 5th Synfuels Worldwide Symposium, Washington D.C., November 1985, and in the November 1989 publication of the same title from Shell International Petroleum Company Ltd, London, UK).

The copolymer of the invention is preferably soluble in such 80:20 petrodiesel:gas to liquid diesel fuel (v/v). A polymer is considered to be soluble in accordance with the invention when at least a 2.0 wt % solution of the polymer in the fuel at 25° C. can be made, if necessary after heating. Preferably a 2.0 wt % solution of the polymer in the fuel at 8° C. can be made. In another embodiment a 9.1 wt % solution of the polymer in the fuel at 25° C. can be made. Preferably the copolymer of any embodiment of the invention, when analyzed as described below in the experimental section, shows a cloud point below 10° C., more preferably a cloud point below 5° C., and even more preferably a cloud point below 0° C.

Examples

A series of exemplary inventive copolymers and comparative polymers were made using different combinations of isobornyl methacrylate and styrene. Isobornyl methacrylate was obtained from Sigma-Aldrich or Evonik (VISIOMER® terra IBOMA). Styrene and polystyrene (Mw of 280,000) were obtained from Sigma-Aldrich.

Molecular Weight:

The molecular weight of the polymer was determined using GPC-MALS.

Column: Phenogel Guard 10^6 A
Column oven: 40° C.
Mobile phase: Tetrahydrofuran
Detection: Wyatt Dawn Heleos 18 angle MALS 633 nm and Wyatt Optilab T-REX Refractive Index Detector.

Cloud Point Determination Method—all Polymers Except Polystyrene.

To a 40 mL clear vial were charged 0.40 g polymer and 19.6 g 80:20 petrodiesel:gas to liquid diesel fuel (v/v). The vial was loosely capped and the mixture was stirred using a magnetic stir bar and stirrer for 1 hour at ambient temperature (about 20 to 25° C.). The mixture was then heated to about 70-80° C. with stirring until a homogeneous solution was obtained. After the solution had cooled to ambient temperature, the cap was removed and a thermometer was introduced to the vial. While stirring with the thermometer, the solution was cooled by immersing the vial in a dry ice/isopropanol bath. The reported cloud point is the temperature at which the solution became visibly turbid or cloudy. As a check, once the cloud point of a polymer was determined, the clear polymer solution was chilled using the dry ice/isopropanol bath below the initially observed cloud point, and then the turbid solution was allowed to warm up past the point at which the solution became clear again while being stirred with a thermometer. The cloud point was judged to be confirmed if the temperature at which the clear polymer solution became cloudy and the temperature at which the cloudy polymer solution became clear were within 1° C. of each other (preferably, within 0.5° C.). For polymers with cloud points below 10° C., care was taken to exclude moisture from the polymer solutions while they were chilled; this was conveniently done by using parafilm to create a crude, flexible cover for the vial through which the thermometer was inserted.

Cloud Point Determination Method—Poly(Styrene).

To a 4-neck 500 mL round bottom flask equipped with an overhead mechanical stirrer, thermometer, condenser and septum/stopper was charged 1.3317 g of poly(styrene) and 65.65 g of 80:20 petrodiesel:gas to liquid diesel fuel (v/v). The resulting mixture was heated to 150° C. with stirring for a total of 3 h. After 3 h at 150° C., the polystyrene had not completely dissolved in this fuel. Based on this observation, the cloud point of polystyrene in the 80:20 petrodiesel:gas to liquid diesel fuel (v/v) fuel was estimated to be greater than 150° C.

Polymerization Procedure

Preparation of Copolymer by Emulsion Polymerization Process

Materials:

| Initial Charge: | |
| --- | --- |
| Deionized water | 310.50 g |
| Aerosol ® OT-75 PG (sodium dioctyl sulfosuccinate, 75% in propylene glycol and water; available from Cytec) | 5.46 g |
| 1% NaOH | As needed |
| Co-solvent: Acetone | 70.0 g |
| Monomer total: | 150.0 g |
| Isobornyl methacrylate: Styrene | See Table 1 |
| Oxidant solution | |
| t-Butyl hydroperoxide, 70% (TBHP) | 0.0266 g |
| Deionized water | 2.50 g |
| Reductant solution | |
| Deionized water | 3.75 g |
| Sodium ascorbate | 0.036 g |
| Iron (II) sulfate heptahydrate, 0.25% in deionized water | 0.30 g |

A 1 L, 4-neck round bottom flask was equipped with an overhead mechanical stirrer; a Y-tube equipped with a nitrogen purge outlet-topped condenser and a thermometer; and two septa. To the flask were charged deionized water and Aerosol OT-75 PG. Using a thermostatted water bath, the reaction temperature was brought to about 50° C. An 11 minute sub-surface nitrogen purge was then initiated via a needle inserted through one of the septa while maintaining a 200 rpm agitation rate.

While maintaining the nitrogen purge, a mixture of isobornyl methacrylate and styrene, and acetone were charged to the reaction vessel. The sub-surface nitrogen purge was continued after the monomer/acetone addition.

In a separate container, a reductant solution consisting of sodium ascorbate and iron(II) sulfate heptahydrate dissolved in deionized water was prepared. The iron(II) sulphate heptahydrate was added after the ascorbate had dissolved and just before use of the reductant solution.

The reaction was purged with nitrogen for an additional 15 minutes after the monomer/acetone addition, and then the resulting dark blue ascorbate solution was added via syringe to the reaction vessel in one shot while maintaining the sub-surface nitrogen purge.

In a second separate container, an oxidant solution consisting of t-butyl hydroperoxide (70%) in deionized water was prepared. About 12 minutes after the addition of the reductant, the oxidant solution was added to the reaction via syringe in one shot while maintaining the sub-surface nitrogen purge.

Within about 6 minutes, the onset of an exotherm was noted, and the sub-surface nitrogen purging was stopped in favour of above surface nitrogen purging. As the reaction progressed, a bluish tint was noted in the emulsion, and it became increasingly more translucent, and a slight increase in viscosity was noted. The reaction temperature reached a maximum of about 55° C. (initial temp: 49.7° C.) before it began to subside after about 30 min. The reaction temperature was maintained thereafter at 48-50° C. using the water bath. After a total of 4.5 h reaction time, the reaction was cooled and poured through cheesecloth into a container.

Solid polymer was isolated by adding the undiluted emulsion polymer to a large excess of methanol. The resulting precipitate was collected by vacuum filtration and washed extensively with methanol.

For the product of Example 7 the molecular weight measured by conventional GPC-MALS and found to be Mn: 1,700,000; Mw: 3,150,000; PDI: 1.91 and the composition when analysed by NMR was found to be 90.5 wt. % isobornyl methacrylate; 9.5 wt. % styrene. Solids (measured gravimetrically-duplicate runs): 26.99%.

For the products of examples 9-12 the amount of TBHP used was reduced to 0.0195 g. For examples 13-15 0.039 g TBHP and 0.072 g sodium ascorbate was used. In examples 10, 12, 14, and 15 no co-solvent was used. In Examples 11, 12, and 14 the amount of sodium dioctyl sulfosuccinate was 2.055 g.

Examples

TABLE 1

Inventive copolymers and comparative examples (CE).

| Example | P Code | Isobornyl Methacrylate (wt. %) | Styrene (wt. %) | Cloud Point in 80:20 fuel at 2% (° C.) | Mw (kD) | Mn (kD) |
|---|---|---|---|---|---|---|
| CE 1 | P41 | 100 | | +0.5 to 3 | 3,200 | 1,800 |
| CE 2 | | | 100 | >150 | | |
| CE-3 | P46 | 67.5 | 32.5 | 45 | 2,670 | 1,250 |
| CE-4 | | 80 | 20 | 21 | | |
| 5 | | 85 | 15 | 12 | | |
| 6 | | 88.5 | 11.5 | 3 | | |
| 7 | P73 | 92 | 8 | −4 | 3,150 | 1,700 |
| 8 | P75A | 95 | 5 | −4 | 4,900 | 3,100 |
| 9 | P75B | 95 | 5 | −4 | 4,400 | 2,400 |
| 10 | P75C | 95 | 5 | −4* | 5,650 | 3,850 |
| 11 | P75D | 95 | 5 | −4* | 4,550 | 3,100 |
| 12 | P75E | 95 | 5 | −4* | 3,650 | |
| 13 | P75F | 95 | 5 | −4* | 3,850 | |
| 14 | P75G | 95 | 5 | −4* | 3,800 | 2,200 |
| 15 | P75H | 95 | 5 | −4* | 2,950 | 1,650 |

*= expected, not determined

The results show that for the polymers of the invention a surprisingly low cloud point is observed, allowing their use as a thickener of fluids over a wide temperature range.

Use Experiment

The products of the invention with a P number in Table 1 were evaluated for their effect on diesel rheology and influence on ignition delay, burn period, and maximum pressure increase in a combustion research unit. First a concentrate was made in diesel containing at least 2.5 wt. % of the copolymer, which was subsequently diluted to a fuel.

The resulting data showed that a product in accordance with the invention, when used in a diesel fuel, improved the fuel efficiency of the direct injection diesel engine running on said fuel and reducing the amount of NOx emitted per kW of energy liberated. While not wishing to be bound by this theory, it is believed that the improved efficiency is because the modified rheology due to the use of the polymer in the fuel, leads to an improved atomization of the fuel and a more complete combustion.

The invention claimed is:

1. A copolymer comprising:
   83-99.95 wt % of bicyclic (meth)acrylate esters (a),
   0.05 to 12 wt % of styrene (b), and
   0 to 19 wt % of ethylenically unsaturated monomers that are not monomer (a) or (b),
up to a total of 100 wt %, wherein the weight percentages of the monomers are based on the total weight of all the monomers incorporated into the copolymer, and wherein the copolymer has a cloud point in 80:20 (v/v) petrodiesel:gas to liquid diesel fuel of 12.5° C. or lower.

2. A copolymer according to claim 1, wherein the bicyclic (meth)acrylate ester is of formula

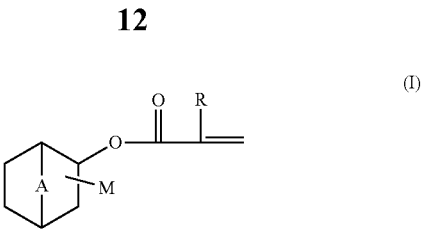

(I)

wherein R is H or —CH$_3$, A is —CH$_2$—, —CH(CH$_3$)— or —C(CH$_3$)$_2$—, and M is covalently bonded to a carbon atom of the six-membered ring and is selected from the group consisting of hydrogen and a methyl group or a plurality thereof.

3. A copolymer according to claim 1, wherein the copolymer is a random co-polymer.

4. A copolymer according to claim 1, comprising
   85-99.95 wt % of bicyclic (meth)acrylate esters (a),
   1 to 10 wt % of styrene (b), and
   0 to 10 wt % of ethylenically unsaturated monomers not being a monomer (a) or (b),
up to a total of 100 wt %, wherein the weight percentages of the monomers are based on the total weight of all the monomers incorporated into the copolymer.

5. A copolymer according to claim 4, comprising
   90-99.95 wt % of bicyclic (meth)acrylate esters (a),
   2.0 to 8.0 wt % of styrene (b), and
   0 to 5 wt % of ethylenically unsaturated monomers not being a monomer (a) or (b),
up to a total of 100 wt %, wherein the weight percentages of the monomers are based on the total weight of all the monomers incorporated into the copolymer.

6. A copolymer according to claim 1, comprising a total of bicyclic (meth)acrylate ester and styrene in an amount of 90 wt % or more of the total weight of all the monomers incorporated into the copolymer.

7. A copolymer according of claim 6, comprising a total of bicyclic (meth)acrylate ester and styrene in an amount of 95 wt % or more.

8. A copolymer according to claim 7, wherein the copolymer is produced from isobornyl methacrylate and styrene.

9. A copolymer according to claim 1, having an average weight average molecular weight of from 100,000 to 50,000,000 D.

10. An additive package for fuel comprising the copolymer of claim 1.

11. A method for the preparation of the copolymer of claim 1, the method comprising the step of radically polymerizing the specified monomers.

12. A method for the preparation of an additive package for fuel, the method comprising combining the copolymer of claim 1 and one or more fuel additives.

13. A method of modifying the rheology of a fluid, the method comprising dissolving the copolymer of claim 1 into the fluid, wherein the fluid is not a fuel for combustion engines.

14. A copolymer according to claim 6 comprising a total bicyclic (meth) acrylic ether and styrene in an amount of 99 wt % or more.

15. A copolymer according to claim 1 having a cloud point in 80:20 (v/v) petrodiesel:gas to liquid diesel fuel of 0° C. or lower.

* * * * *